United States Patent Office 3,355,421
Patented Nov. 28, 1967

3,355,421
CIS-1,4-POLYBUTADIENE STABILIZED
WITH A COMBINATION
Wendell S. Cook, Canal Fulton, Ohio, assignor to The Firestone Tire & Rubber Company, Akron, Ohio, a corporation of Ohio
No Drawing. Filed Oct. 18, 1963, Ser. No. 317,146
8 Claims. (Cl. 260—45.85)

ABSTRACT OF THE DISCLOSURE

Butadiene polymer (30–40% cis-1,4-structure; 6–15% 1,2-structure; balance trans-1,4-structure) is stabilized with a mixture of (1) a derivative of thiodipropionic acid, (2) a 2,4,6-trialkyl phenol and (3) a compound of the classes to which Polygard and Agerite Superlite belong.

This invention relates to the stabilization of polymeric materials produced by the polymerization, by means of lithium-based catalysts, of butadiene alone or by mixtures of butadiene with minor proportions of other monomeric substances which are copolymerizable therewith and whose presence in the polymeric chain does not disturb the essential character of the butadiene polymer configuration. Butadiene when polymerized alone in the presence of lithium-based catalysts results in polymers exhibiting, by infra-red technique 25 to 85 percent cis-1,4-structure and substantially 6 to 15 percent 1,2-structure, the balance being trans-1,4-structure. When butadiene is polymerized with these catalysts in the presence of minor proportions of other unsaturated monomers, the portions of the polymeric chains derived from the butadiene retain this same essential character.

While in many instances the butadiene polymers being discussed and with which the invention is concerned are polybutadienes, it is to be understood that these polymers include in addition to homopolymers of butadiene, also copolymers of butadiene with vinyl monomers such as styrene, o-, m- and p-methyl styrene, α-methyl styrene, the various dimethyl styrenes, indene, vinyl pyridine, vinyl naphthalene, isobutene, acrylonitrile, allyl benzene, allyl toluene, allyl naphthalene, stilbene, methyl stilbene, 1,3-diphenyl-1-butene, isoprene, triphenylethylene, halogen-substituted derivatives of the foregoing and the like. In the case of such copolymers, the polymers contain from about 5 percent to 50 percent by weight vinyl monomer and correspondingly from about 95 percent to 50 percent by weight butadiene-1,3 and are highly unsaturated polymers. In many instances the comonomers may have some tendency to form block copolymers with the butadiene, i.e., to enter the polymeric chains in a non-statistical distribution along the length of the chain. Such products are useful in many applications; however, if it is desired to obtain polymers in which the monomer residues are statistically distributed in random configuration, the concentration of the more rapidly polymerizing monomer may be kept at a low and constant value, by charging the monomers initially with the more rapidly polymerizing monomer at a low concentration with respect to the other monomers, and adding the further amounts of the more rapidly polymerizing monomer incrementally during the polymerization. For example, styrene polymerizes more slowly than butadiene with lithium-based catalysts; thus, if it is desired to obtain a polymer of uniform configuration containing say 20 percent of styrene statistically distributed along the chains, there will be charged initially a mixture of 70 percent styrene and 30 percent butadiene. As the polymerization proceeds, the butadiene is replenished continuously or at frequent intervals by addition of butadiene or a mixture of butadiene and styrene in the proportions desired in the final polymer. Empirically it has been found that this result may be achieved by feeding butadiene alone at a rate such as to keep the reaction pressure constant at its original value.

There may be included in a polymerization recipe for a butadiene polymer which otherwise would undesirably flow at ordinary storage or handling temperatures, a trace amount of a multifunctional monomeric compound capable of adding to a butadiene and/or its polymeric sequences under polymerization conditions. The amount employed will vary to some extent from about 0.025 to 0.4 part of the multifunctional monomeric compound depending on the one hand upon the inherent viscosity of the butadiene polymers and consequent magnitude of the flow problem, and on the other hand upon the concentration of the multifunctional monomeric compound which will produce substantial gel in the polymer, gel being highly undesirable in such polymers. Although divinyl benzene for economic reasons is a preferred multifunctional monomeric compound, multifunctional monomeric compounds generally which are effective include without restriction the other multifunctional aromatic compounds of which trivinyl benzene, tetravinyl benzene, divinyl xylenes, divinyl anthracene, divinyl naphthalene, and divinyl durene are representative, the multifunctional acetylenes of which divinyl acetylene, divinyl diacetylene, divinyl triacetylene, diallyl acetylene and diallyl diacetylene are representative, 4,4'-divinyl azobenzene, 4,4'-divinylphenylether, 4,4'-divinylphenyl sulfide, 4,4'-divinylphenyl disulfide, 4,4' - bis(vinylphenyl)methane, 4,4'-bis (vinylphenyl)ethane, 4,4'-bis(vinylphenyl) amine, diallyl, azodiallyl, vinyl phosphate, diallyl phosphate, triallyl phosphate and ethylene dimethacrylate.

The polymerization may be carried out in bulk, in processes in which the butadiene and other monomers are brought into contact with the catalysts in the absence of any solvents, or in the presence of solvents. The polymerization may also be carried out in the presenceof plasticizing oils or of carbon black or other pigments designed to remain in the final product, or these materials may be added to the polymerization solution at the close of the reaction. Thus 20, 30, 40 or even more parts of carbon black, or of plasticizing oils may be incorporated in the polymer in this manner.

The linear polybutadienes of this invention are typically water white and contain no more than a few tenths of a percent of gel. The low level of catalyst required for producing the polymerization results in no heavy metal residue in the polymer. The polymer is therefore relatively free of material that would tend to discolor or cause deterioration upon aging.

The polybutadienes of linear molecular structure are formed, suitably at a temperature of 0 to 100° C., using about 0.0001 to about 0.1 gram of active lithium as a lithium-based catalyst per 100 grams of butadiene-1,3 monomer. Suitable hydrocarbon solvents for the butadiene or its polymer can be used.

The lithium-based catalyst can be metallic lithium or an organolithium compound in which the lithium exerts a sufficiently strong reducing action to displace hydrogen from water. "Organolithium compounds," as used herein, include the various lithium hydrocarbons, i.e., hydrocarbons in which one or more hydrogen atoms have been replaced by lithium, and adducts of lithium with polycyclic aromatic compounds. Suitable lithium hydrocarbons are, for instance, alkyllithium compounds such as methyllithium, ethyllithium, butyllithium, amyllithium, hexyllithium, 2-ethyl-hexyllithium and n-hexadecyllithium. In addition to the saturated aliphatic lithium compounds, unsaturated compounds are also suitable such as allyllithium, methallyllithium and the like. Aryl-, alkaryl- and aralkyl-lithium compounds such as phenyllithium, the several tolyl- and xylyllithiums, alpha- and beta-naphthyllithium and the like are also suitable. Mixtures of the various hydrocarbon lithium compounds are also suitable. For instance, a catalyst can be prepared by reacting an initial hydrocarbon lithium compound successively with an alcohol and with an olefin such as propylene (i.e., a technique analogous to the "Alfin" technique) whereby a greater or lesser proportion of the lithium from the initial hydrocarbon goes to form a lithium alkoxide and to form a new organolithium compound with the olefin. Additional hydrocarbon lithium compounds are the hydrocarbon polylithium compounds such as for instance any hydrocarbon containing from 1 to about 40 carbon atoms in which lithium has replaced a plurality of hydrogen atoms. Illustrations of suitable hydrocarbon polylithium compounds are alkylene dilithium compounds such as methylene dilithium, ethylene dilithium, trimethylene dilithium, pentamethylene dilithium, hexamethylene dilithium, decamethylene dilithium, octadecamethylene dilithium and 1,2-dilithium propane. Other suitable polylithium hydrocarbons are polylithium aryl, aralkyl and alkaryl compounds such as 1,4-dilithium benzene, 1,5-dilithium naphthalene, 1,2-dilithium-1,3-triphenyl propane, and the like. Tri- and higher lithium hydrocarbons are also suitable, such as 1,3,5-trilithium pentane or 1,3,5-trilithium benzene. Likewise, there may be employed the lithium-polynuclear aromatic hydrocarbon adducts produced by simply reacting lithium metal with naphthalene, anthracene and the like polynuclear aromatic hydrocarbons. The hydrocarbon acquires a negative charge without losing any of its hydrogens, and serves as the anion (the lithium losing an electron to serve as the cation) of the salt. It should be understood that metallic lithium or the various lithium compounds may be used either alone, or in any combination as mixtures with each other.

Polymerization by a lithium-based catalyst is described in British Patent 817,693. This patent discloses polymers of butadiene with substantially 30 to 40 percent content of cis-1,4-structure.

Analysis of polybutadienes by infra-red technique is described in Analysis of Polybutadienes and Butadiene-Styrene Copolymers by Infrared Spectroscopy by John L. Binder in Analytical Chemistry, vol. 26, No. 27, December 1954, and analyses referred to herein were determined by that method.

The butadiene polymers to which this invention relates are subject to decomposition. Both heat and light form a surface skin or gel which turns to various shades of yellow or brown. Such decomposition affects the color and physical properties of the raw polymers, the milling of the raw polymers, and the processing of the compounded polymers, as well as the physical properties of the unaged and aged vulcanizates.

Various stabilizers have been proposed for use with butadiene polymers. This invention relates to a mixture of three components which act synergistically to prevent discoloration of the described polybutadiene when subjected to light and heat.

The mixture includes three components, namely, (1) a derivative of beta, beta-thiodipropionic acid or its equivalent, (2) di-t-butyl-para-cresol or the like as more particularly defined herein, and (3) a compound of the class consisting of the compounds known commercially as Polygard and Agerite Superlite and the like.

*Component 1.*—Component 1 is any derivative of this acid which has the formula

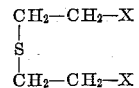

in which each X is a radical from the class consisting of
(a)

in which R is an alkyl group containing 1 to 18 carbon atoms, of which the ester listed in the foregoing paragraph is illustrative,
(b)

namely beta, beta'-thiodipropionamide,
(c)

in which each R is an alkyl radical containing 1 to 12 carbon atoms, of which the following are representative:

N,N-dimethyl beta, beta'-thiodipropionamide
N,N-dioctyl beta, beta'-thiodipropionamide
N,N-didecyl beta, beta'-thiodipropionamide
N,N-didodecyl beta, beta'-thiodipropionamide (d) C≡N, namely beta, beta'-thiodipropionitrile
(e)

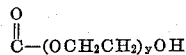

in which y is a whole number from 1 to 20, of which the following are illustrative:

di(2-hydroxyethyl) beta, beta'-thiodipropionate
di(propylene glycol) beta, beta'-thiodipropionate

*Component 2.*—This is a compound having the formula

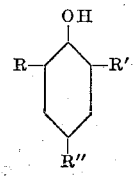

in which

R is an aliphatic hydrocarbon radical containing 1 to 12 carbon atoms,
R' is an aliphatic hydrocarbon radical containing 4 to 12 carbon atoms of the class consisting of t-alkyl and alicyclic radicals, and
R" is an n-alkyl radical containing 1 to 4 carbon atoms.

Compounds utilizable as Component 2 include, for example:

2,6-di-t-butyl-4-methylphenol
2,6-di-t-octyl-4-methylphenol
2,6-di-t-nonyl-4-ethylphenol
2,6-dicyclohexyl-4-propylphenol
2,6-dicyclopentyl-4-butylphenol
2,6-dicyclohexyl-4-methylphenol
2,6-diisobornyl-4-methylphenol
2,6-diisobornyl-4-propylphenol

*Component 3.*—The third component is from the class consisting of (a) the class to which Polygard belongs and (b) the class to which Agerite Superlite belongs.

Polygard is tris-4-nonylphenyl phosphite. Compounds of this class which may replace it have the formula $$(R-\langle\phantom{x}\rangle-O)_3P$$

in which R is from the class consisting of hydrogen and alkyl groups of 1 to 12 carbon atoms, and include:

triphenyl phosphite
tris-4-methylphenyl phosphite
tris-4-n-butylphenyl phosphite
tris-4-n-octylphenyl phosphite
tris-4-t-butylphenyl phosphite
tris-4-dodecylphenyl phosphite Agerite Superlite is a polybutylated p,p'-isopropylidinediphenol, otherwise known as polybutylated Bisphenol A. More specifically it is a mixture of products of the reaction of 4 mols of a tertiary olefin such as isobutylene or diisobutylene with 1 mol of Bisphenol A as described in U.S. Patent 2,877,210. The compounds of this class have the formula $$HO-\langle\phantom{x}\rangle\underset{\underset{CH_3}{|}}{\overset{\overset{CH_3}{|}}{C}}\langle\phantom{x}\rangle-OH$$

in which R is a t-alkyl group, and R' is hydrogen or a t-alkyl group, and each R" is hydrogen, or if both R and R' are t-alkyl either or both R"'s may be t-alkyl, all of said t-alkyl groups containing 4 to 12 carbon atoms. They may be the same or different. The compounds of this class include, as representative, the following compounds:

2,2-bis(3,5-di-t-butyl-4-hydroxyphenyl) propane
2,2-bis(3,5-di-t-octyl-4-hydroxyphenyl) propane
2,2-bis(3,5-di-t-dodecyl-4-hydroxyphenyl) propane
2,2-bis(3-t-butyl-4-hydroxyphenyl) propane
2,2-bis(3-t-octyl-4-hydroxyphenyl) propane
2,2-bis(3-t-dodecyl-4-hydroxyphenyl) propane
2(3,5-di-t-butyl-4-hydroxyphenyl)-2(3-t-butyl-4-hydroxyphenyl) propane
2(4-hydroxyphenyl)-2-(3-t-butyl-4-hydroxyphenyl) propane
2(4-hydroxyphenyl)-2-(3-t-octyl-4-hydroxyphenyl) propane It is to be understood that mixtures of compounds included within the several classes of components may be used.

Such polybutadiene which contains any one or two of the components herein exhibits poor aging characteristics including high gel and poor color.

The components of any mixture have a synergistic effect in the polymer stabilization, and they are non-discoloring when a polymer containing them is subjected to heat and light such as that to which they were subjected in tests to be described herein, i.e. they do not discolor more than very slightly or they prevent any substantial discoloration that would otherwise occur.

The total amount of the three components used will be from about 0.15 to 2.5 parts per 100 parts of the polymer. Usually more of Component 1 will be used than either of the other components. Thus, the amounts of the various components used, per 100 parts of the polymer will be substantially:

| | Parts |
|---|---|
| Component 1 | 0.05 to 1 |
| Component 2 | 0.05 to 0.5 |
| Component 3 | 0.05 to 1 |

The following test results illustrate the synergistic effect of the use of the three components in polybutadiene made by solution-polymerization with butyllithium or equivalent lithium-based catalyst and having the following or an equivalent structure as determined by infra-red technique: substantially 35 to 37 percent cis-1,4-structure and substantially 8 to 10 percent 1,2-structure, the balance being trans-1,4-structure.

The test results compare the effect of different stabilizer mixtures on the polybutadiene after being subjected to aging for 2 days in an oven at 100° C. with air circulation, and after being subjected to sunlight for 30 days. Comparisons of the results show the beneficial synergistic effect on the color of the final products, and in some instances the amount of the gel content after oven aging for 2 days. Polymers with a gel content of over about 5 percent are difficult to process.

The amounts of stabilizer are given as parts per 100 parts of the polymer. The amount of gel is recorded in percent, based on the total polymer. In the table the following abbreviations are used:

DBPC=di-t-butyl-4-methylphenol
DLTDP=dilauryl beta, beta'-thiodipropionate
DMTDP=dimethyl beta, beta'-thiodipropionate
DSTDP=distearyl beta, beta'-thiodipropionate
TDPA=beta, beta'-thiodipropionic acid
TDPAM=beta, beta'-thiodiprionamide
D-2-HTDP=di(2-hydroxyethyl) beta, beta'-thiodipropionate
DPGTDP=di(polyethyleneglycol) beta, beta'-thiodipropionate
TDPN=beta, beta'-thiodipropionitrile
V=very
Lt=light
Yel=yellow
Al=almost
WW=water white
W=white
O=opaque

TABLE I.—TEST RESULTS ON POLYGARD

| Example | A | B | C | D |
|---|---|---|---|---|
| Polymer | 100 | 100 | 100 | 100. |
| DBPC | 0 | 0.5 | 0.5 | 0.5. |
| DLTDP | 0.5 | 0.5 | 0.0 | 0.5. |
| Polygard | 0.5 | 0 | 0.5 | 0.5. |
| Color: | | | | |
| Original | WW | WW | WW | W. |
| After oven aging | Lt Yel | Lt Yel [1] | Yel | Off W. |
| After light aging | Yel | V Lt Yel | V Lt Yel | Off W. |
| Gel after oven aging | 4.075 | 13.77 | 29.45 | 1.17. |

[1] Surface hardened.

The results recorded in Table I show that:
(1) DBPC is necessary for good color on light aging (Example A);
(2) Polygard is necessary for gel and color control on oven aging (Example B);
(3) DLTDP is necessary for gel and color control on oven aging (Example C);
(4) A three-way synergistic combination is required for gel and color control on oven and light aging (Example D).

TABLE II.—TEST RESULTS ON POLYGARD

| Example | E | F | G |
|---|---|---|---|
| Polymer | 100 | 100 | 100. |
| DBPC | 0.2 | 0.2 | 0.2. |
| Polygard | 0.5 | 0.5 | 0.5. |
| DLTDP | 1.0 | | |
| DMTDP | | 1.0 | |
| DSTDP | | | 1.0. |
| Color after oven aging | V Lt Yel | Al WW | Al WW. |
| Color after light aging | Al WW | Al WW | WW. |

This table shows the equivalence of the beta, beta'-thiodipropionate esters of alcohols containing 1, 12 and 18 carbon atoms.

| Example | H (Control) | I | J | K | L | M |
|---|---|---|---|---|---|---|
| Polymer | 100 | 100 | 100 | 100 | 100 | 100. |
| DBPC | 0.2 | 0.2 | 0.2 | 0.2 | 0.2 | 0.2. |
| DLTDP | 1.0 | | | | | |
| Polygard | 0.5 | 0.5 | 0.5 | 0.5 | 0.5 | 0.5. |
| TDPA | | 1.0 | | | | |
| TDPAM | | | 1.0 | | | |
| D-2-HTDP | | | | 1.0 | | |
| DPGTDP | | | | | 1.0 | |
| TDPN | | | | | | 1.0. |
| Color after oven aging 2 days at 100° C. | Trace yel, soft | Lt Brown | Al WW | Trace yel | Al WW | Al WW. |
| Gel after oven aging 2 days at 100° C. | 0 | | 0 | 0 | 0 | 0. |
| Color after 30 days natural-light aging. | Al WW | Al WW | Al WW | Al WW | Al WW | Al WW. |

The results recorded in this table show that:
(1) Thiodipropionic acid is ineffective for color control on oven aging in comparison to DLTDP;
(2)) Various derivatives including beta, beta'-thiodipropionamide, di-(2-hydroxyethyl) beta, beta'-thiodipropionate, di'-(polyethylene glycol) beta, beta'-thiodipropionate, beta, beta'-thiodipropionitrile, dilauryl beta, beta'-thiodipropionate are substantially equivalent in the three-way synergistic combination and have commercial value as non-discoloring antioxidants;
(3) All of the materials tested were satisfactory for natural light aging.

What I claim is:
1. Polybutadiene having incorporated therein 0.15 to 2.5 parts of a 3-component stabilizer mixture per 100 parts of the polymer in order to maintain the gel content below 5 percent,
the polymer being stereolinear due to polymerization with a lithium-based catalyst
and exhibiting by infra-red technique substantially 30 to 40 percent of cis-1,4-structure and 1,2-structure between 6 and 15 percent, the balance being trans-1,4-structure;
the stabilizer mixture being composed of 0.05 to 1.0 part of Component 1 which has the formula

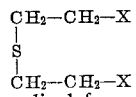

in which each X is a radical from the class consisting of
(a)

in which R is an alkyl radical containing 1 to 18 carbon atoms,
(b)

(c)

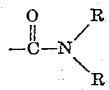

in which each R is an alkyl radical containing 1 to 12 carbon atoms,
(d) —C≡N, and
(e)

in which $y$ is a whole number from 1 to 20;
0.05 to 0.5 part of Component 2 which has the formula

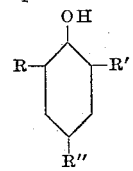

in which

R is an aliphatic hydrocarbon radical containing 1 to 12 carbon atoms,
R' is an aliphatic hydrocarbon radical containing 4 to 12 carbon atoms of the class consisting of t-alkyl and alicyclic radicals, and
R'' is an n-alkyl radical containing 1 to 4 carbon atoms; and
0.05 to 1 part of Component 3 which is from the class consisting of
phosphites which have the formula

in which R is from the class consisting of hydrogen and alkyl groups containing 1 to 12 carbon atoms.
2. The stabilized polybutadiene of claim 1 which includes dilauryl beta, beta'-thiodipropionate as Component 1.
3. The stabilized polybutadiene of claim 1 which includes di-t-butyl-p-cresol as Component 2.
4. The stabilized polybutadiene of claim 1 which includes dilauryl beta, beta'-thiodipropionate as Component 1 and di-t-butyl-p-cresol as Component 2.
5. The stabilized polybutadiene of claim 1 which includes tris-4-nonylphenyl phosphite as Component 3.
6. The stabilized polybutadiene of claim 1 which includes dilauryl beta, beta'-thiodipropionate, di-t-butyl-p-cresol and tris-4-nonylphenyl phosphite as Components 1, 2 and 3 respectively.
7. The stabilized polybutadiene of claim 1, which includes beta, beta'-thiodipropionic amide, di-t-butyl-p-cresol and tris-4-nonylphenyl phosphite as Components 1, 2 and 3 respectively.
8. The stabilized polybutadiene of claim 1, which includes beta, beta'-thiodipropionitrile, di-t-butyl-p-cresol and tris-4-nonylphenyl phosphite as Components 1, 2 and 3, respectively.

References Cited

UNITED STATES PATENTS

| | | | |
|---|---|---|---|
| 3,039,993 | 6/1962 | Friedman | 260—45.95 |
| 3,068,197 | 11/1962 | Rocklin | 260—45.95 |
| 3,080,338 | 3/1963 | Nudenberg et al. | 260—45.7 |
| 3,255,136 | 6/1966 | Hecker et al. | 260—45.85 |
| 3,006,888 | 10/1961 | Reynolds | 260—45.95 |

FOREIGN PATENTS

| | | |
|---|---|---|
| 851,670 | 10/1960 | Great Britain. |
| 817,693 | 8/1959 | Great Britain. |

DONALD E. CZAJA, *Primary Examiner.*

LEON J. BERCOVITZ, *Examiner.*

H. E. TAYLOR, *Assistant Examiner.*

UNITED STATES PATENT OFFICE
CERTIFICATE OF CORRECTION

Patent No. 3,355,421                                   November 28, 1967

Wendell S. Cook

It is certified that error appears in the above identified patent and that said Letters Patent are hereby corrected as shown below:

Column 4, lines 15 to 17, for

             read             

columns 7 and 8, line 4, insert as a heading -- TABLE III --

Signed and sealed this 24th day of June 1969.

(SEAL)
Attest:

Edward M. Fletcher, Jr.                          WILLIAM E. SCHUYLER, JR.
Attesting Officer                                      Commissioner of Patents